Figure 1:
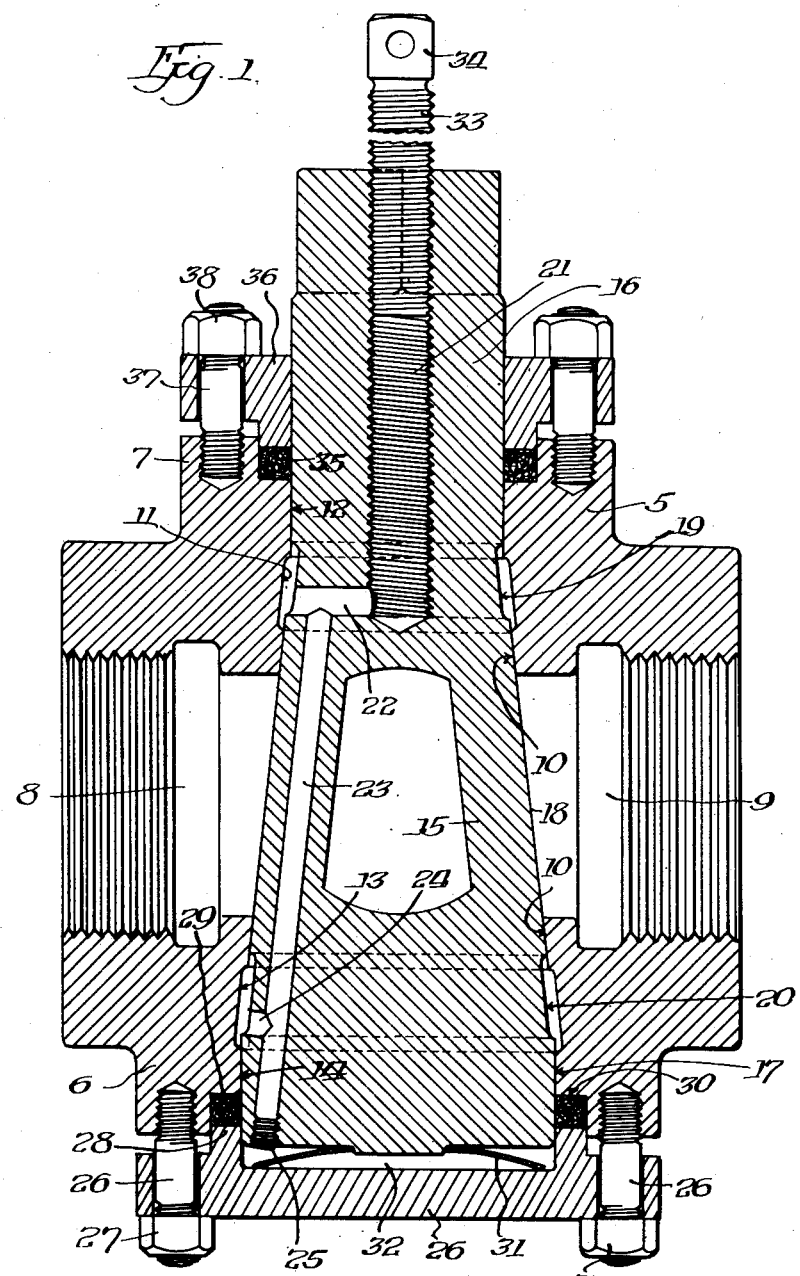

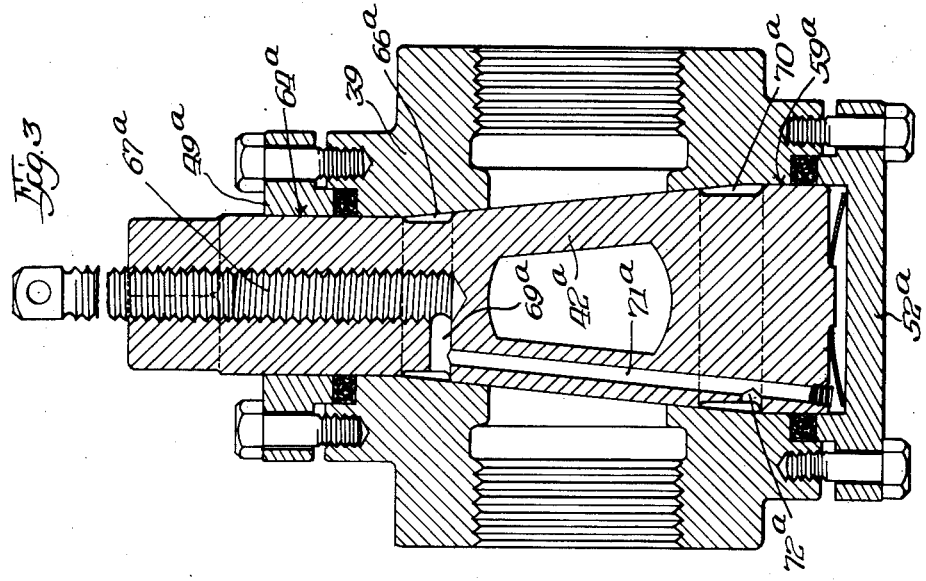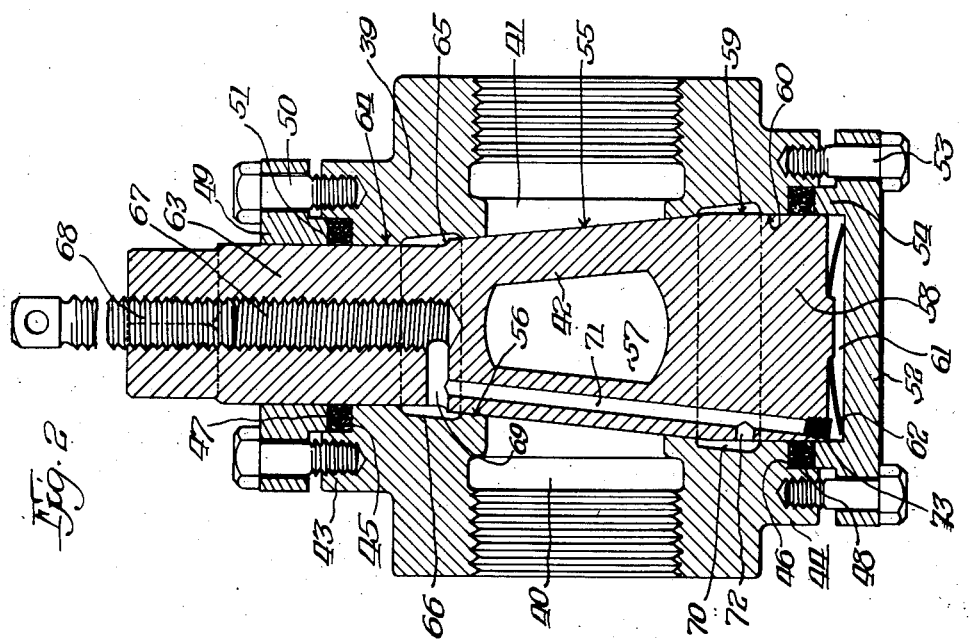

Patented Aug. 22, 1933

1,923,295

UNITED STATES PATENT OFFICE

1,923,295

PLUG VALVE

Paul Carpenter, Chicago, Ill.

Application December 31, 1927, Serial No. 243,991
Renewed September 9, 1932

16 Claims. (Cl. 251—93)

This invention relates to valves, more particularly to an improved valve of the plug valve type.

This invention specifically has reference to such valves of a character which may be lubricated and while the invention takes a preferred structural form in the accompanying drawings, it will be understood that it is susceptible of application to other structures and therefore finds a wide field of utility.

Heretofore in plug valves of the lubricated type, difficulty has been experienced in not only preventing the leakage of the valve when being lubricated, that is, when the lubricant is placed under pressure, but difficulty also has been experienced in that the fluid contents of the pipe line controlled by the valve reach the spring chamber and tend to oxidize or otherwise deleteriously affect the spring member. The present invention is designed to prevent the escape of gas, oil or other fluid to the atmosphere in the event that the plug is moved relatively off its seat during the lubrication process and therefore one of the principal objects of this invention resides in the provision of an improved plug valve in which an improved means is afforded for lubricating the valve; and one in which improved bearings for the valve are provided which prevent leakage of the valve when the lubricant contained therein is placed under pressure; the provision of an improved plug valve of the character referred to in which removal of the plug for cleaning or repair may be readily accomplished; the provision of an improved plug valve wherein escape of gas, oil or other fluids from the pipe line controlled thereby between the valve and its seat is materially retarded and also in which the flow of fluid of the pipe line into the spring chamber is likewise materially retarded; and the provision of a valve of the character described which is simple in construction, compact and efficient in operation.

Another feature of this invention resides in the fact that the lubricant is applied at the points where it is most needed to prevent sticking of the valve, and the arrangement is such that the valve may be completely rotated without undue loss of lubricant into the pipe line, such as occurs in valves having lubricating grooves in the external surfaces thereof extending along the length of the valve, and is such that the valve may be lubricated without exudation of the lubricant to the exterior of the valve, such as occurs in valves having tapered stems.

The foregoing and such other objects and advantages as may appear or be pointed out as this description proceeds are attained in the structural embodiment illustrated in the accompanying drawings, wherein Figure 1 is a vertical sectional elevational view of a valve structure embodying my present improvements, and Figures 2 and 3 are like views of modified forms of valve structures.

Referring now more particularly to Figure 1 of the drawings, I provide a casing 5 having oppositely disposed enlarged flanges 6 and 7 which receive packing and retaining glands hereinafter described, said casing also having fluid passageways 8 and 9 substantially diametrically oppositely arranged and extending through a tapered valve seat 10 extending transversely of the axes of the fluid passageways 8 and 9.

The valve seat 10, it will be observed, is provided at the upper end, as viewed in Figure 1, of the drawings, with an annular recess 11 and further with cylindrical bearing portion 12 for a purpose which will presently appear.

The lower end of the valve seat, as viewed in the figure of the drawings, and in the present instance the larger end, is provided with a lubricant recess 13 corresponding to the recess 11 in that it is at the opposite end of the valve, and a cylindrical bearing portion 14 is provided adjacent to the recess 13.

The valve member 15 is generally tapered in form from its medial portion to one end, said valve having what I term a stem portion 16 which is cylindrical and engages the bearing 12 and is supported thereby.

The other end of the valve member 15 is formed with a cylindrical portion 17 which engages the bearing 14. The tapered bearing surface 18 of the valve engages the tapered valve seat 10.

At the opposite ends of the tapered portion 18 of the valve, I provide annular lubricant recesses 19 and 20 which are complemental to the lubricant recesses 11 and 13 formed in the valve casing.

Lubricant is delivered to the recesses 11, 19, 13 and 20 by the provision of an axial lubricant chamber 21 formed in the stem 16 of the valve, said lubricant chamber communicating with the lubricant recess 19 by a passageway 22 and with the lubricant recess 20 by the provision of lubricant passageways 23 and 24. The passageway 23 extends to the bottom of the valve, that is, the larger end thereof, and is closed by a plug member 25 movably threaded into the valve so as to facilitate cleaning of the passageway 23 if ever required. Removal of the plug 25 will also indicate that lubricant is flowing freely in the plug member 15.

The lower end of the casing, as viewed in Figure 1 of the drawings, is closed by a cap member 26 which is in the nature of a gland and is moved toward the casing by the provision of a series of retaining and actuating members 26 having nuts 27 thereon. The cap or gland member 26 is provided with an annular flange 28 which surrounds the cylindrical portion 17 of the valve member and engages a packing 29 surrounding said cylindrical portion and disposed in an annular recess 30 formed in the flange 6. A yieldingly resistant element, such as a dished spring member 31, may be provided in the spring chamber 32 afforded between the cap 26 and the adjacent end of the plug member. Obviously, any other type of spring may be employed as desired. The spring member 31 tends to hold the valve on its seat and is of such tensile strength that the valve will not ordinarily leave its seat except when lubricant in the chamber 21 is placed under pressure.

To place the lubricant under pressure in the chamber 21, any means may be provided but in the present instance I illustrate a cap screw 33 having a suitable head 34, and the shank of said screw being threaded into the chamber 21. It will be obvious that rotation of the screw 33 to move it outwardly in the chamber 21 will place the lubricant in said chamber and in the lubricant passageways and lubricant recesses of the valve and its seat under pressure, thus forcing the valve from its seat a degree sufficient to properly lubricate the valve. This movement of the valve from its seat is permitted by the spring member 31 but said spring member immediately returns the valve to its seat when the pressure is relieved by the escape of lubricant out of the recesses and between the surface of contact of the valve and its seat.

In order to prevent the escape of lubricant, that is, at the smaller end of the valve, and also to prevent the escape of fluids from the pipe line, I provide a suitable packing 35 surrounding the stem 16 and retained by a gland member 36, said gland member being actuated into position and retained by the plurality of bolts 37 having nuts 38 which engage said gland member.

From the foregoing it will be obvious that in the provision of the packing 29 and 35 and the cylindrical portions of the valve, designated 16 and 17, I am enabled to lift the valve from its seat for lubrication purposes and at the same time effectually prevent any material leakage of the valve, that is, either leakage of the valve in the pipe line or of the lubricant. Furthermore, leakage of the fluid contents of the pipe line into the chamber 32 is effectually prevented by the packing 29 and is further prevented by the insulation afforded by the lubricant. Thus, fluids of corrosive nature, or the like, which may be conducted through the valve, cannot reach the spring chamber and become hardened therein and prevent operation of the valve or deleteriously affect the spring member. It will be noted that the lubricant is not only introduced adjacent to but outside of the surfaces of contact between the valve and its seat, for facilitating rotation of the valve in operation, but also thereafter becomes introduced between such surfaces and the cylindrical portions of the valve and the bearings provided therefor, so that the sticking of the valve, due either to the lack of lubrication between its tapered surface and its seat or between the cylindrical portions and the bearings, is effectually prevented.

Referring now more particularly to the alternative forms of the invention illustrated in Figures 2 and 3, and first with reference to Figure 2, I provide a valve casing 39, provided with oppositely disposed fluid passageways 40 and 41 which communicate with a transverse passageway through the valve casing which latter passageway serves to receive and contain the valve plug member 42 similarly to the plug member 15 shown in Figure 1.

The casing 39 is provided, adjacent to the opposite ends of the passageway containing the plug valve member, with annular flanges 43 and 44 suitably annularly shouldered as at 45 and 46 for reception of compressible packings 47 and 48.

As viewed in Figure 2 the upper end of the valve is provided with a gland member 49 secured to the flange 43 by the provision of cap screws 50, and said gland 49 is provided with an annular abutment or flange 51 which engages the packing 47.

Similarly the lower end of the valve, as viewed in Figure 2, is provided with a closure plate or cap 52 secured in position by the provision of cap screws 53 passing through the cap 52 and into the flange 44. The cap 52 is provided with an annular flange or abutment 54 which is adapted to engage the packing 48.

The plug valve member in the present instance is somewhat similar in general contour to that of the plug valve member 15, that is, the plug valve member 42 includes the generally tapered portion 55 engaging a valve seat 56 located adjacent to the passageways 40 and 41, said plug valve member being provided with a transverse passageway 57 and adapted to register with the passageways 40 and 41 for permitting flow of fluids therethrough.

Similarly to the invention shown in Figure 1, it is an object of the form of the invention shown in Figure 2 to properly lubricate the valve and the bearings therefor without the necessity of providing external grooves the tapered face of the valve, and to this end the valve member, at its larger end, is provided with a cylindrical portion 58 having a cylindrical surface 59 engaging a complementally formed surface 60 in casing 39. It will be observed that the cylindrical portion 58 extends downwardly into a recess 61 formed in cap 61. Said recess contains a dished spring member 62 tending to maintain the tapered portion of the valve member on its seat. The packing 48, it will be observed, is in snug engagement with the cylindrical portion 58 to prevent the escape of fluid, that is lubricant and to prevent the contents of the passageways 40 and 41 from entering the recess or spring chamber 61.

The upper end of the plug valve member is provided with a cylindrical stem 63 having a cylindrical surface 64 engaging the packing 47 and fitting fairly snugly in apertures in the casing and gland 49. The upper end of the stem 63 is suitably formed to receive an implement for imparting rotation.

For the purpose of lubricating the valve shown in Figure 2 and as an alternative arrangement from that shown in Figure 1, the cylindrical portion 63 extends downwardly and joins the tapered portion 55 at the top of the valve member to form a shoulder 65, and adjacent to said shoulder, in the adjacent surface of the casing 39, I provide an annular recess 66.

Lubricant is supplied through the plug valve member by the provision of an axial threaded aperture 67 which may be termed a lubricant chamber, a cap screw 68 being threaded into said chamber for placing the lubricant contained therein under pressure. The lower or inner end of the chamber 67 communicates with the recess 66 by the provision of a radial passageway 69 for lubricant.

At or adjacent the lower end of the tapered portion 55 of the valve member in the adjacent surface of the casing 19, I provide an annular recess 70 and lubricant is supplied to said recess by the provision of an internal passageway 71 in the valve member communicating with the passageway 69 and having an outlet at 72 adjacent to said recess 70. To facilitate manufacture, the passageway 71 is bored from the larger end of the plug valve member, the lower end of said passageway 71 being closed by threaded plug 73.

Upon reference to Figure 3, it will be observed that the construction of the casing 39a, plate 52a, gland 49a and the other parts complemental to those parts shown in Figure 2 are substantially identical, and therefore, a detailed description of the same parts in Figure 3 is not believed to be necessary. In the form of the valve shown in Figure 2, it will be noted that the seating surface of the valve and casing, that is, the surfaces 55 and 56, are defined by limits between the lower edge of the recess 66 and the upper edge of the recess 70, there being no grooves in the seating surface of the valve and casing, and, therefor, no tendency to leakage of lubricant into passageways 40 and 41 or conversely, the leakage of fluid from said passageways past the valve is materially reduced or retarded. Similarly, in Figure 3 the valve member 42a is provided with cylindrical end surfaces 59a and 64a so as to form bearings for the valve member, and immediately adjacent to each of said cylindrical surfaces, respectively, I provide, in the valve member itself, annular lubricant recesses 66a and 70a, these recesses being in communication with the lubricant chamber 67a by the provision of passageways 69a, 71a and 72a formed in the body of the valve.

From the foregoing it will be observed that in providing the lubricant recesses 11, 13, 66, 70, 66a and 70a in positions shown, that is, as shown in Figure 1, partly in the valve and partly in the casing, and in Figures 2 and 3 in the casing and in the valve, respectively, the necessity for the provision of grooves in the seating face of the valve or casing or both is obviated, and I am enabled not only to readily lift the valve from its seat the desired amount to introduce lubricant between the surface of contact of the valve and the casing, but in addition to apply this lubricant where it is most needed, and in addition prevent leakage, either from the pipe line through the valve during the lubricating process or, conversely, leakage of the lubricant into the pipe line, and thereby loss of said lubricant. In addition to this, I am able to prevent, in a large measure, the leakage of fluids (especially desirable where those of an acid or caustic nature are conveyed) from the pipe line into the spring chamber which it will be obvious to those skilled in this art is a marked advantage in this type of valve.

Having thus described my invention and illustrated its use, what I claim as new and desire to secure by Letters Patent is:

1. In a valve, the combination of a casing having a tapered valve seat and fluid passageways in said valve seat, a tapered rotatable plug member mounted in said casing and engaging said seat and having a passage adapted to be brought into registration with said fluid passageways, both ends of said tapered valve member being cylindrical, and cylindrical bearings in the casing for the cylindrical portions of said valve member, and lubrication channels extending within the valve member and discharging lubricant adjacent to the bearing surface between the tapered portion and the cylindrical portions.

2. In a valve, the combination of a casing having a tapered valve seat and fluid passageways in said valve seat, a tapered rotatable plug member mounted in said casing and engaging said seat and having a passage adapted to be brought into registration with said fluid passageways, said valve member having a cylindrical portion at the larger end thereof, and of substantially the same diameter as said larger end, a bearing for said cylindrical portion in said casing, and a lubrication channel between and lying in part in each of said tapered and cylindrical portions.

3. In a plug valve, the combination of a casing having a tapered seat, said tapered seat having the opposite ends terminating in cylindrical portions, a valve member having a tapered portion for engagement with the tapered seat and cylindrical portions for engagement with the cylindrical portions of said seat in said casing, a lubricant passageway in said valve communicating with the seat and discharging lubricant only adjacent to said cylindrical portions, and means for placing the lubricant in said passageways under pressure.

4. In a plug valve, in combination, a casing having a tapered valve seat provided, at the ends thereof, with cylindrical bearing portions, a tapered valve member engaging said seat and having cylindrical portions for engaging said bearing portions, recesses in the surface of contact between the valve and its seat at the junction of said tapered and said cylindrical portions, a lubricant chamber in said valve communicating with and discharging into said recesses, one end of said casing being closed by a cap member and yieldingly resistant means between said cap member and the adjacent end of said valve.

5. In a plug valve, in combination, a casing having a tapered valve seat provided, at the ends thereof, with cylindrical bearing portions, a tapered valve member engaging said seat and having cylindrical portions for engaging said bearing portions, recesses in the surface of contact between the valve and its seat at said cylindrical portions, a lubricant chamber in said valve communicating with said recess, a packing in one of said cylindrical portions, a cap member having a gland portion for retaining said packing, said packing preventing leakage past the valve to the space between said cap and valve, and a spring member in said space.

6. A valve comprising a casing having a tapered seat and a passageway therethrough, a tapered plug seated in the casing and having a hole adapted to register with the passageway through the casing, means for yieldingly holding the plug against its seat, recesses adjacent to and in part outside of the tapered seating surface of the plug and the casing, a reservoir for containing fluid or plastic substance, connections between the reservoir and the recesses, and means for exerting pressure on the substance in the reservoir to force it into the recesses and thereby lift the plug from its seat.

7. A valve comprising a casing having a tapered seat and a passageway therethrough, a tapered plug seated in the casing and having a hole adapted to register with the passageway through the casing, means for yieldingly holding the plug against its seat, recesses in part outside of but adapted to communicate with the tapered seating surface of the plug and casing when the plug is lifted from its seat, a reservoir for containing fluid or plastic substance, connections between the reservoir and the recesses, and means for exerting pressure on the substance in the reservoir to force it into the recesses and thereby lift the plug from its seat.

8. A valve comprising a casing having a tapered seat and a passageway therethrough, a tapered plug seated in the casing and having a hole adapted to register with the passageway through the casing, means for normally holding the plug against its seat, a circumferential groove in the plug located in part outside of the tapered seating surface of the plug and casing, a reservoir in the plug adapted to contain lubricant, connections between the reservoir and said groove, and means for exerting pressure upon the lubricant in the reservoir to force it into the groove and thereby lift the plug from its seat.

9. A valve comprising a casing having a tapered seat and a passageway therethrough, a tapered plug seated in the casing and having a hole adapted to register with the passageway through the casing, means for normally holding the plug against its seat, a circumferential groove between the plug and the casing located in part outside of the tapered seating surface of the plug and casing, a reservoir in the plug adapted to contain lubricant, connections between the reservoir and said groove, and means for exerting pressure upon the lubricant in the reservoir to force it into the groove and thereby lift the plug from its seat.

10. A valve comprising a casing, a tapered plug seated in the casing, means for yieldingly holding the plug against its tapered seat, a circumferential groove between the plug and the casing located in part outside of the tapered seating surface of said plug and casing, a reservoir in the plug adapted to contain lubricant, a passageway wholly within the body of the plug for connecting the reservoir with said groove, and means for exerting pressure upon the lubricant in the reservoir to force it into the groove and thereby lift the plug from its seat.

11. A valve comprising a casing having a passageway therethrough, a tapered plug seated in the casing and having a hole adapted to register with the passageway through the casing, means for yieldingly holding the plug against its tapered seat, a recess located in part outside of but adapted to communicate with the tapered seating surface of the plug and casing when the plug is lifted from its seat, a reservoir for containing fluid or plastic substance, connections between the reservoir and the recess, and means for exerting pressure on the substance in the reservoir to force it into the recess and thereby lift the plug from its seat.

12. A valve comprising a casing having a passageway therethrough, a tapered plug seated in the casing and having a hole adapted to register with the passageway through the casing, means for normally holding the plug against its tapered seat, a circumferential groove in the plug located adjacent to and in part outside of the tapered seating surface of the plug and casing, a reservoir in the plug adapted to contain lubricant, connections between the reservoir and said groove, and means for exerting pressure upon the lubricant in the reservoir to force it into the groove and thereby lift the plug from its seat.

13. In a plug valve, the combination of a casing having a tapered seat, said tapered seat having the opposite ends terminating in cylindrical portions, a valve member having a tapered portion provided with a plain external surface for engagement with the tapered seat and cylindrical portions for engagement with the cylindrical portions of said seat in said casing, a lubricant passageway in said valve communicating with the seat and discharging lubricant only adjacent to said cylindrical portions, grooves in the surfaces of contact between the valve seat arranged at the juncture of said tapered and cylindrical portions and lying in part in each thereof, and means for placing the lubricant in said passageways under pressure.

14. In a plug valve, in combination, a casing having a tapered seat and fluid passageways having openings in said seat, a rotatable plug valve member having a tapered surface for engagement with said seat, said valve member having a cylindrical portion at one end thereof of a diameter substantially that of the end to which it is adjacent, a complemental cylindrical bearing therefor in said casing, means for introducing lubricant into the valve member, and lubricant channels in the surfaces of contact between the valve and casing, said channels lying at the junction of and in part in said cylindrical and in part in said tapered portions.

15. A stop-cock comprising; a body having a conical plug seat, and flow passages communicating therewith, a tapered plug having a flow passage therein adapted to connect said body flow passages, said plug fitting said seat; a spindle extending from the smaller end of said plug, there being a spindle bore formed in said body surrounding said spindle to provide a space therebetween; packing in the space between said spindle and said spindle bore; a portion extending from the larger end of said plug, there being a bore formed in said body about said portion to provide a space therebetween; a packing in the space between said portion and said last mentioned bore, there being an annular channel formed in said plug seat midway between the body flow passages and the last mentioned bore; means for supplying fluid under high pressure to said channel to force said plug from said seat, and a duct connecting said fluid supply means with said annular channel.

16. In a valve, the combination of a casing having a tapered valve seat and fluid passageways in said valve seat, a tapered rotatable plug member mounted in said casing and engaging said seat and having a passage adapted to be brought into registration with said fluid passageways, said valve member having a cylindrical portion at the larger end thereof and of substantially the same diameter as said larger end, a bearing for said cylindrical portion in said casing, a lubrication channel between and lying in part in each of said tapered and cylindrical portions, and a packing surrounding said cylindrical portion between said lubrication channel and the adjacent end of said cylindrical portion.

PAUL CARPENTER.